July 18, 1939.  E. P. HAYWARD  2,166,146
DEFROSTER FOR WINDSHIELDS
Filed June 1, 1937  2 Sheets—Sheet 2
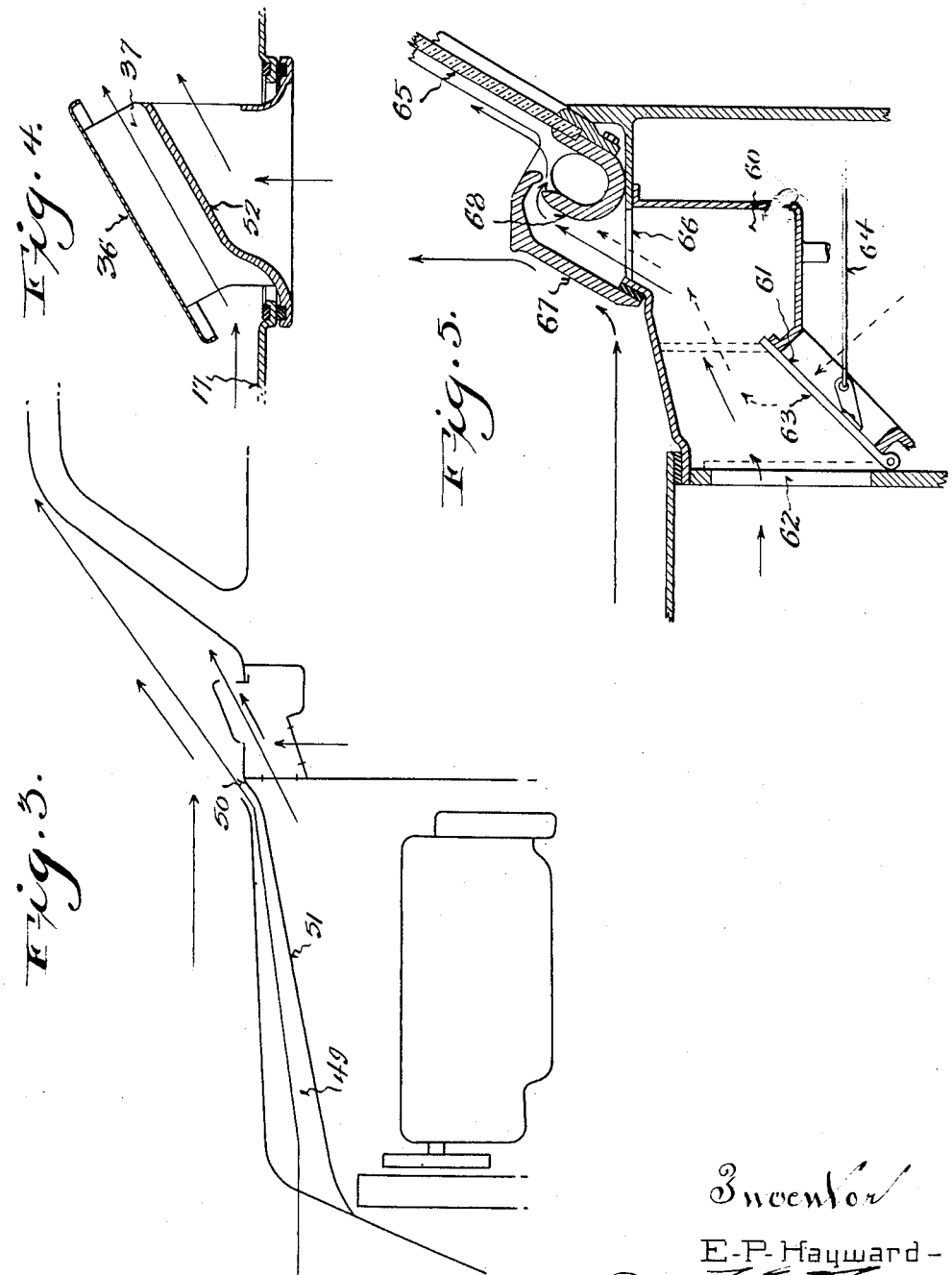
Inventor
E. P. Hayward Patented July 18, 1939

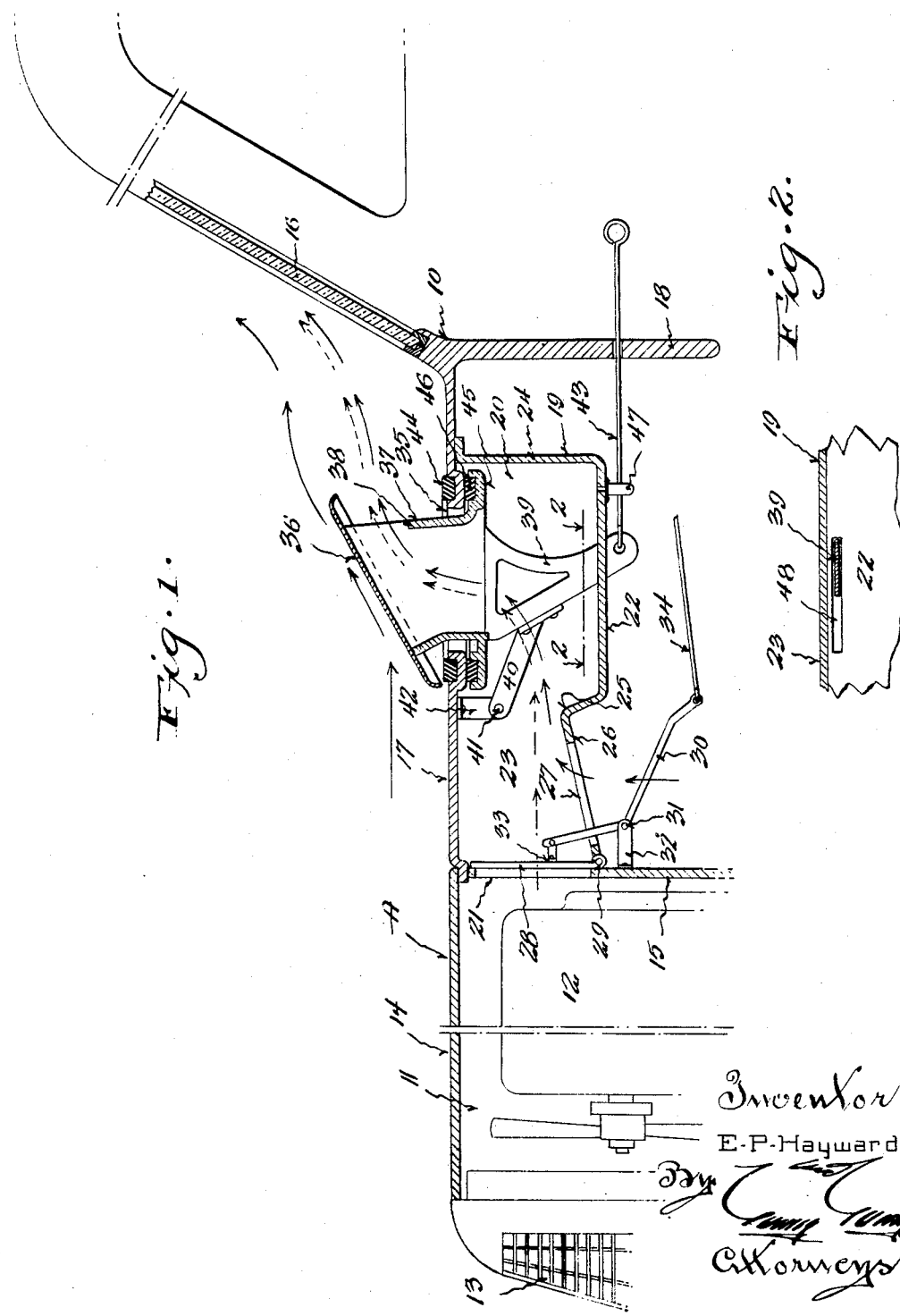

2,166,146

UNITED STATES PATENT OFFICE 2,166,146

DEFROSTER FOR WINDSHIELDS

Edmund Pray Hayward, Buenos Aires, Argentina

Application June 1, 1937, Serial No. 145,794

2 Claims. (Cl. 20—40.5)

This invention appertains to motor vehicles, and more particularly to a novel means for preventing the collection of frost, ice, snow, and the like on the windshield of an automobile.

Many attempts have been made to prevent the collection of ice and snow on the windshields of automobiles. Generally, they take the form of electric heaters and conduits leading from the casing of the heater for the car body. Both of these forms are objectionable. The electric heaters run down the car batteries, and the conduits leading from the heaters are cumbersome and take away heat from the car body and the air cools before the same reaches the windshield.

It is, therefore, one of the primary objects of my invention to provide novel means for creating a continuous stream of warm air against the outer face of the windshield, whereby to effectively prevent the gathering and formation of ice and snow on the windshield without the employment of the car body heater or electric appliances.

Another salient object of my invention is to provide means under the control of the driver of the vehicle for directing the hot air flowing over the engine back against the windshield for the purpose of warming said windshield and for carrying foreign matter away from the windshield.

A further object of my invention is the provision of a chamber under the cowl of the vehicle having communication with the engine compartment and the cowl ventilator, so that when the ventilator is raised and inclined upwardly toward the windshield, the hot air from the engine compartment will be forced through the chamber and against the windshield.

A further important object of my invention is to provide a communication between the chamber and the interior of the car and a single door for controlling both the communication between the chamber and the engine compartment and the communication between the chamber and the car body, so that when the door is in one position, the communication will be closed between the body and the chamber and open between the chamber and the engine compartment to permit the flow of hot air against the windshield; and when the door is in another position the communication between the engine compartment and the chamber will be closed, and the communication between the chamber and the interior of the car body will be open, so that air flowing past the ventilator will create a partial vacuum in the chamber and thus draw out warm foul air from the interior of the car body.

A still further object of my invention is to provide means for creating a hot air stream against the windshield and a second air stream flowing at an angle past the windshield, the second air stream functioning to divert foreign matter from the windshield.

With these and other objects in view, the invention consists in the novel construction, arrangement, and formation of parts, as will be hereinafter more specifically described, claimed, and illustrated in the accompanying drawings, in which drawings:

Figure 1 is a fragmentary longitudinal section through a motor vehicle, showing my novel appliance incorporated therewith, the door being shown in a raised position for permitting the establishment of communication between the chamber and the interior of the car body.

Figure 2 is a detail, horizontal sectional view through the chamber, taken on the line 2—2 of Figure 1 looking in the direction of the arrows.

Figure 3 is a fragmentary diagrammatic view illustrating means for creating a flow of air at an angle past the windshield to divert foreign matter therefrom.

Figure 4 is a detail, vertical sectional view illustrating a modified form of means for constructing the ventilator, whereby to direct a flow of warm air past the windshield and a stream of air at an angle past the windshield to divert foreign objects.

Figure 5 is a fragmentary vertical section through a portion of a motor vehicle illustrating a slightly modified form of my invention incorporated therewith.

Referring to the drawings in detail, wherein similar reference characters designate corresponding parts throughout the several views, the letter A generally indicates an automobile which can be of any desired type or manufacture, and, as illustrated, the same includes the body 10 having a compartment 11 for the internal combustion engine 12.

The compartment 11 carries at the front thereof the usual grill-work 13 for permitting a flow of air past the radiator and engine. This compartment is normally closed by a hood 14 at its top and a dashboard 15 at its rear. The windshield 16 inclines upwardly and rearwardly from the cowl 17, and depending from the cowl in spaced relation to the dashboard 15 is the instrument board 18. The construction described is of a character common with motor vehicles, and the showing thereof is more or less diagrammatic.

In accordance with my invention I build a casing 19 under the cowl so as to provide an interior chamber 20. The chamber is closed at its top by the cowl and its front by the dashboard, and the dashoard has formed therein an opening 21, whereby communication can be had between the engine compartment and the chamber.

It is preferred to form the bottom wall 22, the side walls 23, and the rear wall 24 of the casing out of a single stamping of metal, and to weld or otherwise secure the upper edges of the side and rear walls to the cowl. Obviously, however, the casing can be formed in other manners.

The bottom wall 22 of the casing toward its front end is offset, as at 25, and is provided with a downwardly inclined portion 26, which has formed therein an opening 27 to permit communication to be had between the compartment 20 and the interior of the car body.

A single door 28 is utilized for the openings 21 and 27, and this door is pivoted at its lower edge, as at 29, between said openings. When the door is in its raised position, as shown in Figure 1, communication is cut off between the engine compartment and the chamber, and communication is established between the chamber and the interior of the body.

Any preferred means can be provided for operating the door 28, and, as shown, I have provided a bell-crank lever 30 pivoted at its angle, as at 31, on a bracket 32 carried by the inner face of the dashboard. One arm of the bell-crank is pivotally secured, as at 33, to the door, and the other arm of the bell-crank has secured thereto an operating rod 34, which can lead to the instrument board 18, so that said rod can be conveniently manipulated by the driver of the vehicle.

The cowl 17 has formed therein a relatively large ventilating opening 35, which is adapted to be normally closed by a swinging ventilator cap or plate 36. This plate or cap 36 is carried by a depending neck 37, the lower end of which opens at all times into the compartment 20. The rear portion of the neck directly under the ventilator cap or plate 36 is provided with an opening 38.

Formed on or carried by the neck 37 is a depending operating crank 39, and this crank has secured thereto a rearwardly extending pivot arm 40, the outer end of which is pivotally mounted on a pin 41 carried by a depending bracket 42 secured to the cowl. The lower end of the operating crank 39 has pivotally secured thereto an operating rod 43, which extends through the instrument board 18, and obviously by moving the rod 43 forwardly and rearwardly the ventilator can be closed and opened.

To prevent the leakage of moisture into the cowl when the ventilator cap or plate is in its lowered position, the cowl around the opening 35 is channeled for the reception of a gasket 44, against which the edge of the cap or plate 36 is adapted to fit. The lower edge of the neck carries a peripheral flange 45, which carries a gasket 46 that is adapted to engage the inner surface of the cowl when the ventilator is in its raised position.

If desired, a drain pipe 47 can communicate with the bottom of the casing, so as to lead any water that may accumulate in the casing away from the same.

By referring to Figure 2, it will be noted that I have led the operating crank 39 through a slot 48 in the bottom wall 22 of the casing, but it is to be understood that the operating means for the ventilator can be arranged exteriorly of this casing.

In operation of my improved device, when the door 28 is moved to its elevated position, as shown, and the ventilator is raised, air flowing past the ventilator will tend to create a partial vacuum or suction within the chamber 20, and, consequently, foul air will be drawn from the interior of the vehicle body, through the opening 27, into the atmosphere. Air hitting the inclined face of the cap or plate 36 of the ventilator will be diverted upward past the windshield, and this diverted stream of air will tend to carry foreign objects away from the windshield.

When the door 28 is in its lowered position, the opening 27 will be closed, and the opening 21 will be opened. Consequently, air flowing past the engine 12 from the grill 13 will flow into the compartment 20, through said opening 28, and out of the ventilator, through the opening 38, against the windshield 16. Consequently, a stream of hot air is impinged against the windshield, and this air will effectively raise the temperature of the windshield and divert the collection of frost, snow, and ice on the windshield.

As shown in Figure 3 of the drawings, I can build a compartment 49 in the engine compartment under the hood, and a slot 50 can be formed in the hood at the rear end thereof. The compartment 49 is preferably formed by an upwardly and rearwardly inclined plate 51, and, obviously, air flowing into the compartment, through the grill, will be directed upwardly and rearwardly at an angle past the windshield, so that a forcible stream of air will be provided to divert dust, dirt, rain, and snow away from the windshield.

As a modification of this arrangement, the ventilator itself can be constructed so as to create this stream of air. Thus, by referring to Figure 4, it can be seen that the neck of the ventilator is open at its front and rear, and the side walls of the neck are connected by an upwardly and rearwardly inclined cross-plate 52. This cross-plate will direct the warm stream of air from the compartment 20 against the windshield, and will direct a stream of air flowing over the top of the engine hood upwardly at an angle past the windshield, so as to carry foreign objects away from the same.

In Figure 5, I have illustrated means for eliminating the swinging ventilator, and in this arrangement I still provide a chamber 60 arranged under the cowl, and this chamber has communication both with the interior of the car by means of an opening 61, and with the engine compartment by means of an opening 62. A single door 63 is provided for controlling these openings, and means 64 is also provided for actuating the door.

The upper end of the compartment 60, at its rear end, opens out through the cowl adjacent to the windshield 65 by means of a slot 66. This slot is covered by an upwardly and inwardly inclined guard plate 67, which partially extends over a transversely extending trough 68 located directly below the windshield.

When the door 63 is in the position shown over the opening 61, warm air flowing into the compartment 60 through the opening 62 will flow through the opening 66, under the shield plate 67, and will be directed against the windshield to prevent the collection of snow and frost thereon. Any rain or moisture passing down the windshield will be caught by the trough 68, and the ends of the trough can open out through the sides of the vehicle body. It is to be noted that the air stream striking against the outer face of the shield plate 67 will be diverted upwardly and away from the windshield, so as to prevent foreign objects from impinging against the windshield.

The provision of the stream of air flowing past the windshield at an angle is not only important for keeping foreign objects away from the windshield, but also permits the hot air stream to act more effectively on the windshield.

Changes in details may be made without departing from the spirit or the scope of my invention, but what I claim as new is:

1. In a motor vehicle having an engine compartment, a cowl, and a windshield, a casing arranged interiorly of the cowl having communication with the engine compartment and with the atmosphere through the cowl adjacent the windshield, a swinging ventilator for controlling the ventilation between the casing and the atmosphere, means for operating the ventilator, a depending neck carried by the ventilator extending into the casing for receiving air therefrom and having its rear end open and facing the windshield, and a laterally extending flange formed on the lower end of the neck abutting the inner face of the cowl when the ventilator is in an extreme elevated position.

2. In a motor vehicle, a casing arranged interiorly of the cowl having communication with the engine compartment of the automobile and the atmosphere through the cowl adjacent the windshield, a swinging ventilator for controlling the communication between the casing and the atmosphere, means for operating the ventilator, a depending neck carried by the ventilator extending into the casing and having its rear end and its front end open, and a transversely extending deflecting plate carried by the neck of the ventilator arranged in parallel relation to the top of the ventilator and spaced therefrom.

EDMUND PRAY HAYWARD.